Dec. 4, 1962  W. L. PRESCOTT  3,066,945
STEERABLE HAND CART
Filed April 24, 1961
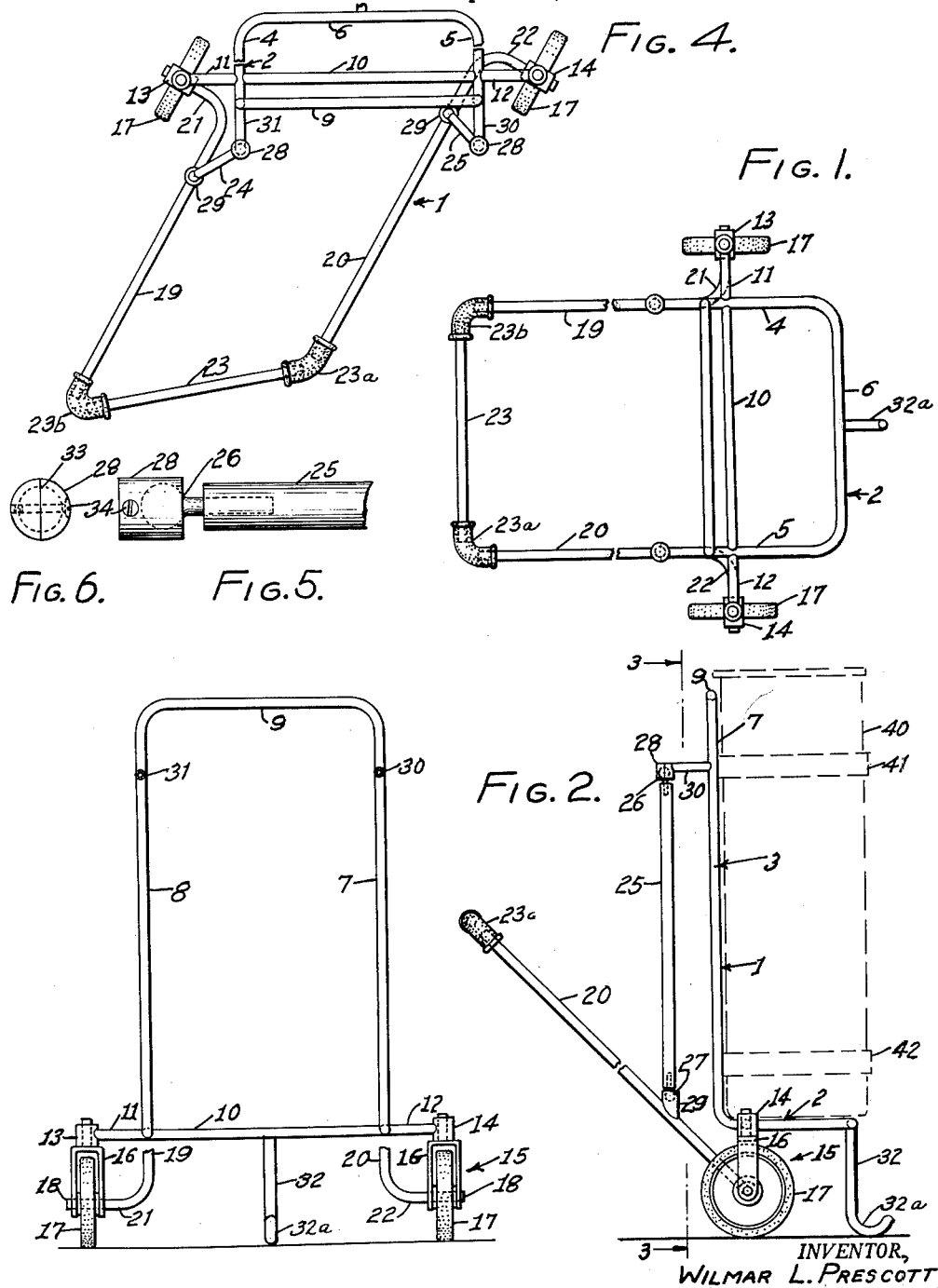
INVENTOR,
WILMAR L. PRESCOTT;
BY
ATTORNEY

3,066,945
STEERABLE HAND CART
Wilmar Lewis Prescott, 1943 N. Bronson Ave.,
Hollywood, Calif.
Filed Apr. 24, 1961, Ser. No. 105,157
5 Claims. (Cl. 280—47.11)

The present invention relates to a steerable hand cart of the type which may be used for various and sundry purposes such as for carrying a golf bag containing golf clubs or for the purpose of conveying heavy or bulky articles.

An object of the invention is to provide a handle cart adapted for manual movement and wherein the operator by variably shifting in a given direction, a handle or handles the wheels of the cart will be turned to direct lateral cart movement without disturbing cart balance.

A cart of the character of this invention facilitates the carrying of articles in restricted areas, which would be quite impossible if the wheels were not steerable. Thus, devious narrow passageways may be traversed while carrying a load.

An object of the invention is to provide a steerable hand cart which may be inexpensively fabricated, readily storable in a restricted space, so constructed as to gain a mechanical advantage in the steering of the same and generally superior to hand carts now known to the inventor.

With the above and other objects in view, the invention consists in the novel and useful provision, formation, construction, association and relative arrangement of parts, members and features, all as shown in one embodiment in the accompanying drawing, described generally and more particularly pointed out in the claims.

In the drawing:

FIGURE 1 is a top plan view of the steerable hand cart;

FIGURE 2 is a side elevation of the cart, a golf bag being shown supported upon the platform thereof;

FIGURE 3 is a fragmentary sectional view on the line 3—3 of FIGURE 2;

FIGURE 4 is a plan view similar to that of FIGURE 1, the handles being shifted to turn the wheels;

FIGURE 5 is a fragmentary detail of a ball and socket construction embodied in the invention; and, FIGURE 6 is an end view of the socket member shown in FIGURE 5.

Referring now to the drawing, the steerable hand cart includes a framing 1 having a base or platform portion 2 and uprights 3 in substantially right angular relationship to the platform framing 2. In this construction I may conveniently bend tubing to form the uprights and the platform as shown in the figures, whereby there are two spaced apart parallel members at 4 and 5 interconnected by a transverse piece 6 with two parallel uprights 7 and 8 joined together by a transverse top piece 9. Such a construction may be integrally formed and is strong. Joined to the members 4 and 5 and spaced from the transverse member 6 is a transverse member 10 and extending outwardly from sides of the members 4 and 5, in axial alignment with member 10, are arms 11 and 12. The arms 11 and 12 may be integral with member 10 or separate therefrom. Each arm is secured to a pivot mounting 13 and 14 for wheel assemblies, of which there are a pair and designated generally as 15. Each wheel assembly 15 includes an inverted U-shaped journal bracket 16 carrying a pivot mounting 13 or 14 and a wheel 17 within the journal bracket 16.

Two elongated tubular members 19 and 20 serve as handles and each member is provided at one end with a right angularly bent extremity 21 and 22 functioning as a lever. Each lever also forms an axle for a wheel as indicated at 18. The upper ends of the handles 19 and 20 are flexibly interconnected by a transverse top tubing member or tie bar 23 through the medium of flexible sleeve type elbows 23a and 23b. These elbows may be formed of rubber, rubber composition, plastic, coiled wire, ball and socket, tube wound metal tape or other means, and the ends of the tubing members 19, 20 and 23 are secured thereto in any suitable manner.

I provide a pair of spaced links 24 and 25, both ends of which carry balls 26 and 27, the balls being received within socket members 28 and 29. Socket members 28 for both links are secured to the ends of arms 30 and 31 which arms are secured by welding or otherwise in right angular relationship to the uprights 7 and 8. The lower socket members 29 are welded or otherwise secured to each handle member 19 and 20. When the cart has its parts in the position of FIGURES 1 and 2, the links 24 and 25 are parallel.

The member 6 of the platform intermediately carries a depending skid, support or post 32 having a curved foot 32a. This skid or support holds the platform portion in a horizontal position when the skid and the wheels engage the ground, as shown in FIGURE 2.

I have found it expedient, for the purpose of adjustment, to diametrically split the socket members 28 as shown in FIGURE 6 at 33 and to provide an adjusting screw 34 passed through the two halves at right angles to the split 33 whereby the socket may be clamped around a ball, if found desirable.

The operation, uses and advantages of the invention are as follows.

The platform portion 2 of my hand cart may hold a solid platform of some type depending upon the character of the articles to be supported and transported. However, this is a minor feature of my invention as the platform 2 may be provided with various types of tie bars to provide a lattice support for any type of work. Where the device is used for carrying a golf bag with clubs, it is evident that the clubs may vary in weight in accordance with the number of clubs carried in the bag. However, the cart when tipped will bring the center of gravity of the bag, which bag is indicated in dotted lines at 40 in FIGURE 2, over the wheel axles to support the same when the cart is moved over the ground. Normally the bag is held on the platform and against shifting by means of straps or belts as shown in dotted lines at 41 and 42. Other means may be resorted to. As the golfer or caddy moves over the fairway, any desire on his part to move the cart in a given direction such as to the right, viewing FIGURE 4, is accomplished by shifting the handles 19 and 20 to the left. The flexible elbows 23a and 23b permit this shifting and in so doing the planes of the wheels are turned to the right. Obviously the shifting of the handles to the right will turn the wheels to the left. Shifting of the handles from the position of FIGURE 1 to that of FIGURE 4 is done smoothly without any distortion of the platform framing. It will be observed that the linkage 24 and 25 swivels in the ball and socket connections with the handles 19 and 20 and with the arms 30 and 31. The arms 30 and 31 remained fixed as to position during all swivel action of the links. Wheel turning is without platform interference as the wheels are spaced outwardly from and beneath the same. The wide tread between the wheels and the aft position thereof relative to the platform lends stability to the structure.

I claim:

1. A steerable hand cart as disclosed, including: a tubular platform, tubular arms extending from each side of the platform and wheel assemblies pivotally mounted to each arm, a pair of vertically inclined tubular handles having upper and lower ends each handle of which is provided at its lower end with an operating arm secured to each wheel assembly, a transverse tubular member and flexible elbows interconnecting the upper ends of each tubular handle with the transverse tubular member whereby the handles may be shifted to turn each wheel assembly.

2. A steerable hand cart including: a tubular frame forming a platform and a back, arm extensions secured to said platform, wheel assemblies pivotally mounted on said arm extensions, a pair of spaced apart tubular handles having upper and lower ends, each lower end being provided with an operating arm, each operating arm secured to a wheel assembly, flexible means interconnecting the upper ends of the two arms whereby shifting movement of both arms turns both wheel assemblies on the pivotal mounts simultaneously and shiftable links interconnecting the tubular handles and tubular frame.

3. A steerable hand cart including: a tubular frame forming a platform and uprights forming a back in substantially right angular relationship, wheel assemblies including mountings secured to the platform framing, a pair of spaced apart vertically directed tubular handles having upper and lower ends, the upper ends being flexibly interconnected, the lower ends of said handles formed to provide operating arms secured to the wheel assemblies and likewise forming axle portions for said assemblies and whereby shifting of the arms will turn both wheel assemblies.

4. The device as set forth in claim 3, said uprights provided with arms extending therefrom with each arm provided with a socket member, said handles each provided with a socket member, and links provided at both ends with ball members housed in the sockets between the arms, and the handles.

5. The device as set forth in claim 3, said platform provided with means for supporting the platform in a horizontal position.

References Cited in the file of this patent
UNITED STATES PATENTS

| | | |
|---|---|---|
| D. 184,962 | Ress | Apr. 21, 1959 |
| 115,895 | Reese | June 13, 1871 |
| 2,885,218 | Cosley | May 5, 1959 |